United States Patent [19]
Congelio et al.

[11] Patent Number: 5,817,708
[45] Date of Patent: *Oct. 6, 1998

[54] LOW VOLATILE ORGANIC SOLVENT BASED ADHESIVE

[75] Inventors: Carmen D. Congelio, Lorain; Andrew M. Olah, Spencer, both of Ohio

[73] Assignee: The B. F. Goodrich Company, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 684,117

[22] Filed: Jul. 19, 1996

[51] Int. Cl.$^6$ ........................... C08K 5/3415; C08K 5/11; C08K 5/095; C08L 27/24
[52] U.S. Cl. ........................ 524/104; 524/306; 524/314; 524/319; 524/321
[58] Field of Search ..................................... 524/104, 314, 524/315, 319, 321, 306

[56] References Cited

U.S. PATENT DOCUMENTS

| | | | |
|---|---|---|---|
| 2,616,868 | 11/1952 | Heisenberg et al. | 524/98 |
| 3,406,136 | 10/1968 | Scarso et al. | 524/114 |
| 3,468,834 | 9/1969 | Oda et al. | 514/364 |
| 3,726,826 | 4/1973 | Knight | 524/113 |
| 3,765,983 | 10/1973 | Putzier | 156/293 |
| 3,984,499 | 10/1976 | Wardlow, Jr. et al. | 524/314 |
| 4,098,719 | 7/1978 | Hushebeck | 252/364 |
| 4,152,313 | 5/1979 | Fogle et al. | 524/104 |
| 4,197,355 | 4/1980 | Shepherd | 428/520 |
| 4,209,437 | 6/1980 | Fischer | 524/297 |
| 4,244,852 | 1/1981 | Prem et al. | 524/297 |
| 4,256,524 | 3/1981 | Hare | 156/220 |
| 4,351,756 | 9/1982 | Prem et al. | 524/314 |

(List continued on next page.)

FOREIGN PATENT DOCUMENTS

| | | |
|---|---|---|
| 646301 | 2/1994 | Australia . |
| 0046957 | 3/1982 | European Pat. Off. . |
| 0183112 | 6/1986 | European Pat. Off. . |
| 0370844 | 5/1990 | European Pat. Off. . |
| 0489485 | 6/1992 | European Pat. Off. . |
| 0547593 | 6/1993 | European Pat. Off. . |
| 4911931 | 2/1974 | Japan . |
| 5388042 | 8/1978 | Japan . |
| 54-111543 | 8/1979 | Japan . |
| 59-187067 | 10/1984 | Japan . |
| 711059 | 1/1980 | U.S.S.R. . |
| 1036489 | 7/1966 | United Kingdom . |
| 1090932 | 11/1967 | United Kingdom . |
| 1582500 | 1/1981 | United Kingdom . |
| WO9316130 | 8/1993 | WIPO . |

OTHER PUBLICATIONS

ASTM Designation: D1599–88, "Standard Test Method for Short–Time Hydraulic Failure Pressure of Plastic Pipe, Tubing, and Fittings", pp. 26–27, Oct. 1993.
ASTM Designation: D1784–92, "Standard Specification for Rigid Poly(Vinyl Chloride) (PVC) Compounds and Chlorinated Poly(Vinyl Chloride) (CPVC) Compounds", pp. 47–50, Dec. 1992.
ASTM Designation: D2235–93a, "Standard Specification for Solvent Cement for Acrylonitrile–Butadiene–Styrene (ABS) Plastic Pipe and Fittings", pp. 83–87, Nov. 1993.
ASTM Designation: D2564–93, "Standard Specification for Solvent Cements for Poly(Vinyl Chloride) (PVC) Plastic Piping Systems", pp. 209–212, Jul. 1993.
ASTM Designation: F493–93a, "Standard Specification for Solvent Cements for Chlorinated Poly(Vinyl Chloride) (CPVC) Plastic Pipe and Fittings", pp. 820–824, Apr. 1993.
Material Safety Data Sheet, DuPont Chemicals, "DBE", Jan. 19, 1994, pp. 1–7.
Material Safety Data Sheet, DuPont, "DBE Solvent", Mar. 30, 1994, pp. 1–8.
DuPont Publication, Wilmington, DE, "DuPont DBE Solvent is Cleaning with Care", May 1994.
DuPont Nylon, "Dibasic Esters (DBE)", Jun. 1993.
DuPont Chemicals, "DBE Solvent Applications DBE–Based Industrial Cleaning Solvents and Paint Strippers", May 1994.
DuPont Publication, May/Jun. 1994, "The DBE Difference", pp. 14–15.
*Chemical & Engineering,* Elisabeth M. Kirschner, "Environment, Health Concerns Force Shift in Use of Organic Solvents", Jun. 20, 1994, pp. 13–20.
*Adhesive Age,* John E. Cuzic, "Chlorinated Solvents Offer Performance and Low VOC", Jul. 1989, pp. 26–28.
J. Adhesion, C.Y. Yue, "Influence of the Bonding Solvent on the Structure and Strength of Solvent Welded Joints", 1986, vol. 20, pp. 99–116.
American Waterworks Association Annual Conference 1981 pt. 2 PWACDO, K.D. Reich et al, "Diffusion of Organics from Solvent Bonded Plastic Pipes Used for Potable Water Plumbing", Jun. 16, 1994, pp. 1249–1260.
International Journal Adhesion and Adhesives, vol. 8, No. 1, Jan. 1988, C.Y. Yue, "The Structure and Strength of Solvent Welds Between Dissimilar Amorphous Thermoplastics", pp. 47–53.
Plastics and Rubber Processing and Applications, vol. 12, No. 2, 1989, C.Y. Yue et al., "The Failure Mechanisms In and the Durability of Solvent Welded Pipeline Systems", pp. 105–112.
South Coast Air Quality Management District, Rule 1168, Dec. 4, 1992, pp. 1168–1–1168–16.

*Primary Examiner*—Peter A. Szekely
*Attorney, Agent, or Firm*—Helen A. Odar

[57] ABSTRACT

The present invention relates to a low VOC solvent based adhesive comprising a mixture of at least two organic solvents and a thermoplastic resin. The low VOC solvent based adhesive of the instant invention volatilizes at substantially reduced rates as compared to conventional solvent based adhesives. Furthermore, this novel low VOC solvent based adhesive is easy to apply, cost effective, cures within a reasonable time without the use of heat, ultraviolet light or other mechanical devices.

12 Claims, No Drawings

U.S. PATENT DOCUMENTS

| | | | |
|---|---|---|---|
| 4,365,079 | 12/1982 | Hsu et al. | 560/191 |
| 4,602,051 | 7/1986 | Nabeta et al. | 523/137 |
| 4,604,413 | 8/1986 | Nabeta et al. | 523/137 |
| 4,672,084 | 6/1987 | Dierdorf et al. | 524/113 |
| 4,675,354 | 6/1987 | Sperling | 524/99 |
| 4,687,798 | 8/1987 | King, Sr. | 524/100 |
| 4,910,244 | 3/1990 | Dierdorf et al. | 524/179 |
| 5,077,331 | 12/1991 | Fahey et al. | 524/317 |
| 5,252,634 | 10/1993 | Patel et al. | 523/218 |
| 5,376,717 | 12/1994 | Patel et al. | 524/314 |
| 5,422,388 | 6/1995 | Patel et al. | 524/104 |
| 5,470,894 | 11/1995 | Patel et al. | 523/218 |
| 5,495,042 | 2/1996 | Patel et al. | 560/190 |

LOW VOLATILE ORGANIC SOLVENT BASED ADHESIVE

FIELD OF INVENTION

This invention relates to a low volatile organic (VOC) solvent based adhesive. In particular, the invention relates to a low VOC solvent based adhesive which is capable of joining two thermoplastic materials together. Furthermore, the invention relates to a low VOC solvent based adhesive which volatilizes at a substantially reduced rate as compared to conventional solvent based adhesives for thermoplastic materials. Preferably, the invention comprises a low VOC solvent based adhesive used to join two objects or articles made from chlorinated polyvinyl chloride (CPVC).

BACKGROUND OF THE INVENTION

Solvent based adhesives have been used extensively to join thermoplastic pipe and fittings for numerous years. These solvent based adhesives provide for a convenient way to join thermoplastic materials relatively easily and quickly. Often, thermoplastic pipe and fittings joined in this manner can even be tested the same day.

Generally, the solvent based adhesives comprise a solvent or mixture of solvents as well as resin and other additives such as thixotropic agents. The solvent based adhesive dissolves the surface layer of the thermoplastic material to which it is applied, causing it to swell. The resin in the adhesive solution accelerates the setting of the two materials to be joined as well as reduces the internal stresses. As the adhesive cures by evaporation, the diffusion of the solvents bonding of the mated surfaces occurs. The primary solvents used in conventional solvent based adhesives include tetrahydrofuran, methyl ethyl ketone and cyclohexanone. These solvents are very volatile and adhesives made therefrom have VOC levels in the range of 750 to 850 g/l as measured by the South Coast Air Quality Management District (SCAQMD) 316A. Furthermore, prior to the application of these conventional solvent based adhesives, the thermoplastic material must be prepared with either a primer such as tetrahydrofuran or a cleaner such as acetone, in order for the adhesive to be effective. Therefore, even more volatile organic compounds are released into the atmosphere. In addition, since these conventional solvent based adhesives are largely formed from solvents, the solvent tends to spread to a large area and drip in their application to the thermoplastic materials, causing additional volatization. The following patents and references are examples of conventional solvent based adhesives and/or primers for adhesives for thermoplastic materials.

U.S. Pat. No. 3,726,826 discloses a stabilized adhesive solution for polyvinyl chloride. The solution comprises 5 to 25 weight percent of a post-chlorinated polyvinyl chloride resin in tetrahydrofuran and from 0.4 to about 5 weight percent of 1,2-butylene oxide.

U.S. Pat. No. 4,098,719 to Hushebeck describes a primer to be used in the assembly of polyvinyl chloride (PVC) pipe and fitting or PVC pipe and fittings to acrylonitrile-butadiene-styrene (ABS) pipe or fittings. The primer consists essentially of from 0.5 to about 2.5 percent by weight of an unplasticized polyvinyl chloride resin dissolved in a solvent. The solvent is a mixture if tetrahydrofuran and dimethylformamide.

An addition example of a conventional solvent based adhesives can also be found in European Patent Application 0 489 485 A1 to Texaco Chemical Company. This application discloses a process for welding plastic materials. The materials are welded by applying alkylene carbonate in its pure form or as a mixture with a co-solvent such as aromatic hydrocarbons, ketones, esters, ethers, glycol ethers, imidazoles, tetramethyl urea, N,N'-dimethyl ethylene urea, 1,1,1-trichloroethane and N-methyl pyrrolidone.

Furthermore, U.S. Pat. No. 4,910,244 describes a storage stable adhesive containing CPVC. The solvent based adhesive comprises 5 to 30 percent by weight of CPVC and 95 to 70 percent by weight of an organic solvent as well as a stabilizer. This mixture provides improved stability when stored in tin plated steel containers.

As seen from the brief descriptions of a sample of references describing conventional solvent based adhesives, these adhesives generally have a low solids content. Therefore, these adhesives are extremely volatile.

Evaporation of solvents from solvent based adhesives provides for an air pollution problem. The major portion of the solvent emission occurs during the application of the adhesive to the thermoplastic materials to be joined. In addition, a primer, itself a very volatile material, is also used to prepare the thermoplastic surfaces and therefore, there is additional solvent volatilized and released to the air. Furthermore, emission of the solvent also occurs from the container containing the solvent based adhesive which is usually kept open during the application of the adhesive to the thermoplastic materials. Finally, spills can occur during the application of the solvent based adhesive providing yet another means for the emission of volatile organic materials into the air.

Due to the environmental awareness occurring today, laws and regulations are being enacted to limit the amount of VOC levels in all materials, in particular solvent based adhesives. In California, for example, the South Coast Air Quality Management District (SCAQMD) has set regulations limiting the VOC levels of materials used to join thermoplastic materials. For example, pursuant to Rule 1168 of SCAQMD, the VOC limits for CPVC and/or polyvinyl chloride (PVC) solvent based adhesives, effective 1/1/94 were 450 grams/liter as measured by SCAQMD 316A. The VOC limits for acrylonitrile styrene butadiene (ABS) solvent based adhesives were 350 grams/liter as of Jan. 1, 1994 as measured by SCAQMD 316A. Further legislation has reduced these limits even further. As of Jan. 1, 1998, the SCAQMD VOC limits for CPVC and PVC solvent based adhesives will be 250 grams/liter whereas the SCAQMD VOC limits for ABS solvent based adhesives will remain at 350 grams/liter.

Several adhesives have been formulated which contain lower VOC levels than the conventional solvent based systems. The VOC levels of conventional solvent based adhesive systems was generally about 650 grams/liter as measured by SCAQMD 316A prior to 1994. For example, Australian Patent Application disclose a adhesive comprising more than 80 weight percent of n-methyl-2-pyrrolidone, more than 0.25 weight percent of a viscosity modifier and more than 10 weight percent of a vinyl based polymer. The viscosity modifier can be silica, a thickening agent or a thixotropic agent. Similarly, U.S. Pat. No. 4,675,354 discloses a glue solution which comprises a solution of a water insoluble synthetic organic polymer in a solvent such as N-methyl-2-pyrrolidone. This glue solution may be used at tropical temperatures without problems arising from solvent vapors and fire risks.

Also, U.S. Pat. No. 4,687,798 discloses a solvent cement used for joining water insoluble polymers. The solvent cement comprises about 10–15 weight percent of a water soluble polymer and a solvent. The solvent comprises ethyl acetate and N-methyl-2-pyrrolidone. The ethyl acetate ranges from about 3 percent to about 50 percent by weight of the solvent with the balance being N-methyl-2-pyrrolidone.

In addition, European Patent Application 0 547 593 A1 discloses a low VOC adhesive composition The composition of this European Patent Application comprises a mixture of from 5 weight percent to about 60 weight percent of at least one water insoluble polymer, from about 1 weight percent to about 30 weight percent of inorganic or synthetic resinous hollow microspheres and from about 20 weight percent to about 70 weight percent of at least one volatile organic liquid which is a solvent for the water insoluble polymer.

U.S. Pat. No. 5,470,894 to Patel et.al., provides for an additional example of a low VOC solvent based adhesive. The low VOC solvent based adhesive in this patent is used to join CPVC pipes. The adhesive comprises a high vapor pressure solvent comprising from about 15 to about 35 weight percent of tetrahydrofuran and 0 to about 30 weight percent of methyl ethyl ketone; a low vapor pressure solvent comprising about 20 to about 45 weight percent cyclohexanone, 0 to about 30 weight percent of N-methyl pyrrolidone and from 0 to 10 weight percent of dibasic esters. Patel, et. al. state that the VOC level of their adhesive is at or below 450 grams/liter, while the adhesive meets or exceeds the required performance standards such as hydrostatic burst strength and hydrostatic sustained pressure tests.

Nonetheless, there is still an environmental concern with using any one of the above emunerated adhesives. There are however, alternatives to solvent based adhesives. These are mechanical, reactive, or thermal systems. Mechanical joining systems are generally very expensive to use. Examples of mechanical joining systems include Acorn Fittings from Hepworth Building Products; PolyGrip Fittings from Philmac Corporation and Uncopper Fittings from Genova. Thermal systems are unpredictable due to the difficulty in consistently producing adequate pipe/fitting unions. Examples of thermal systems include hot melt glues available from the Minnesota, Mining and Manufacturing Company. These thermal systems are difficult to apply and perform poorly. An example of a reactive system includes epoxy. Epoxy is available from the Noble Corporation under the tradename Copper Bond. Other examples of an epoxy include General Purpose Urethane, High Shear Strength Urethane and All Purpose Epoxy, all available from the Hardman Corporation. However, these reactive systems are problematic because they have long cure times, poor green strength. Their efficacy is also temperature dependent; at low temperatures epoxy materials have very long cure times. Furthermore, there may be by products of the chemical reactions which may be detrimental to the strength of the pipe. Even though these alternatives exist, they are cost prohibitive, time consuming and cumbersome.

Despite some of the air quality problems, there are benefits to continuing to use the solvent based adhesives to join thermoplastic materials. First, solvent based adhesives are easy to use and many workers have years of experience using these types of adhesive systems. Second, there are low production costs in making the solvent based adhesives as well as long term durability once the adhesives are used to join the two thermoplastic materials. Further, the solvent based adhesives can be used on location to join the two thermoplastic materials together without any additional equipment. Fourth, the solvent based adhesive system cures pretty rapidly, allowing for testing. In addition, one technique can be used to apply the solvent system for all sizes of pipe. Generally, the solvent based adhesive system can be applied to the joint at any temperature in the range of 0° to 120° F., if the solvent based adhesive system meets the Underwriter's Laboratories Test 1821. Also, the solvent based adhesive systems do not rely upon a chemical reaction for their efficacy. Moreover, the solvent based adhesive system can possibly be stored long term at ambient temperatures. Therefore, overall the solvent based adhesive systems are generally practical and economical.

Thus, there currently exists a need for a low VOC solvent based adhesive which volatilizes at substantially reduced rates as compared to conventional solvent based adhesives, has adequate shelf and storage life. Furthermore, there exists a need for a low VOC solvent based adhesive that meets the required performance criteria necessary to join two thermoplastic materials together.

SUMMARY OF THE INVENTION

The present invention comprises a novel low VOC solvent based adhesive comprising a mixture of two volatile organic solvents, and resin. Optionally, the novel low VOC solvent based adhesive may contain a thixotropic agent such as silica. Preferably, the novel low VOC solvent based adhesive comprises 5–20% thermoplastic resin; 38–65% of n-methyl-2-pyrrolidone; 20–45% dimethyl adipate and 1.5–2% of silica.

The low VOC solvent based adhesive of the instant invention has a VOC level of less than 450 grams/liter as measured by SCAQMD 316A. Preferably, the novel low VOC solvent based adhesive has a VOC level of less than 250 grams/liter as measured by SCAQMD 316A.

DETAILED DESCRIPTION

The low VOC solvent based adhesives of the instant invention comprises a mixture of two volatile organic liquid solvents which are capable of vaporizing at ambient temperatures as well as a thermoplastic resin. Other ingredients, including other solvents, fillers, thixotropic agents or stabilizers may be added to the low VOC solvent adhesive as desired. The low VOC solvent based adhesives as described herein in further detail generally have the following characteristics: viscosity from 500–3000 centipoise; a green strength of 1–2 minutes; less than 20% solids in the adhesive, an indefinite shelf life in nonreactive containers and a variable cure time. The cure time can be varied for different end-use needs by minor adjustments of the solvent ratios used.

The thermoplastic resins that can be used in the formulation of the low VOC solvent based adhesive of the instant invention include polyvinyl chloride, chlorinated polyvinyl chloride, ABS, polystyrene, and any other amorphous thermoplastic resins which are soluble in the mixture of the two volatile organic solvents. Generally, the resin used in the solvent based adhesive of the instant invention is the same as the resin used to form the thermoplastic materials to be joined. Preferably, the resin is either CPVC, PVC or ABS. The CPVC and/or PVC resin should have an inherent viscosity in the range of about 0.6 to about 0.96. Preferably, the chlorination levels for the CPVC resins should range from about 58 to about 72 weight percent. Preferably, the chlorination level for the PVC resin should be less than 57%. Examples of possible ABS resins to be used include the Cycolac ABS resins from GE Plastics and the Lustran ABS resins from Monsanto. Most preferably, the resin is CPVC. Generally, the CPVC resin used is CPVC resin as defined in Class 23477 of the ASTM D1784. However, the molecular weight of the CPVC resin should not be below 0.68 IV (inherent viscosity). Examples of suitable CPVC to be used in the instant invention include TempRite 674×571 CPVC, and TempRite 677×670 CPVC, all available from The B.F. Goodrich Company. (TempRite is a registered trademark of The B.F.Goodrich Company). The most preferred CPVC resin is TempRite 674×571, from The B.F.Goodrich Company. The amount of thermoplastic resin added to the low VOC solvent based adhesive ranges from about 5 to about 20 weight percent.

In addition to the thermoplastic resin, the low VOC solvent based adhesive of the instant invention includes a mixture of two volatile organic liquid solvents that are capable of vaporizing at ambient temperatures. The first organic solvent that is used in the mixture is a low vapor pressure solvent. N-methyl-2-pyrrolidone ("NMP") is the most preferred low vapor pressure solvent. NMP is commercially available from Aldrich Chemical, Ashland, BASF, Chemoxy International and Janssen Chemical. The first organic liquid solvent is generally found in the novel adhesive in the range of from 38 to about 65 weight percent. In the most preferred embodiment, 50 percent of NMP is present in the low VOC solvent based adhesive.

The second organic liquid solvent in the solvent based adhesive is chosen from the group consisting essentially of pimelic acid, monomethyl glutarate, monomethyl pimelate, monomethyl azelate, monomethyl sebacate, monoethyl adipate, dimethyl succinate, dimethyl glutarate, dimethyl adipate, dimethyl pimelate, dimethyl suberate, dimethyl azelate, glutaryl chloride, adipoyl chloride, and pimcloyl chloride, or mixtures thereof. For example, mixtures of dimethyl glutarate, dimethyl adipate and dimethyl succinate can be used. A commercially available example of such a mixture is DBE-9, available from DuPont Chemical. The second organic solvent is found in the range of about 20% to about 45% in the solvent mixture. The most preferred second organic solvent is dimethyl adipate ("DMA"). DMA is available from the DuPont Company under the tradename DBE-6. The DBE-6 is believed to be a mixture comprising 98.7% DMA, <0.5% dimethyl glutarate, and <0.1% dimethyl succinate. In the most preferred embodiment, 27% of the DMA is used in the low VOC solvent based adhesive mixture.

The low VOC solvent based adhesive also may include other optional ingredients. For example, the low VOC solvent based adhesive of the present invention may include minor amounts of other solvents which do not raise the VOC level of the adhesive above 450 grams/liter and which are miscible with the mixture if the two volatile liquid organic solvents. Examples of possible solvents which can be used include ketones, esters, halogenated solvents, ethers, and other liquids. Ketones which can be used in the instant invention as additional solvents include acetone, methyl ethyl ketone, methyl isobutyl ketone, isophonene, cyclohexanone. Examples of esters which can be used in the instant invention include methyl acetate, ethyl acetate, ethyl formate, ethyl proprionate, and butyl acetate. Halogenated solvents which can be used include methylene chloride, ethylene dichloride and trichloroethylene. Methyl cellulose is an example of a possible ether which can be added as an additional solvent. Other possible liquids which can be utilized as additional solvents include tetrahydrofuran and any other high vapor pressure solvent provided that the other criteria, including but not limited to green strength enumerated above are met. Generally, these other liquids are added to obtain faster cure times or volatilization.

Fillers which are known in the art and any other materials which can function as inert fillers can be used in the instant invention. Examples of fillers which can be used in the instant invention include hollow spheres (glass or ceramic), polymers, glass spheres, magnesium silicate, magnesium oxide, shell flour, alumina, talc, barium sulfate, calcium carbonate, and other fine powder. These fillers are generally added in the amount of about 0.05 to 20 weight percent to the composition. Fillers can be added to reduce the cost, maintain the viscosity or reduce the VOC slightly. Preferred fillers include polymers and calcium carbonate.

The low VOC solvent based adhesive also may include optionally thixotropic agents in the composition. Examples of possible thixotropic agents which can be used include fumed silica, precipitated silica, benotite, clay, ground quartz, mica, ethyl cellulose, hydrogenated castor oil, organic modified clay, other thickeners or viscosity adjustors. Preferred thixotropic agents include fumed silica. Generally, the amount of thixotropic agent used if used at all is in the range of about 1 to about 3% by weight.

Further, pigments, dyes, dispersions or colorants may be added to the low VOC solvent based adhesive. Examples of possible pigments which can be used include titanium dioxide, calcium carbonate or carbon black. The amount of pigment used is generally in the range of 0.05% to about 5.0% by weight.

The low VOC solvent based adhesive may include other additives. This includes any additives known to those in the art. Suitable additives include for example but not limited to various stabilizers, antioxidants, electrostatic dissipative agents, smoke retardants, moisture scavengers, and acid scavengers. Since several additives can be combined in countless variations, the total amount of additive can vary from application to application. Optimization of the particular additive composition is not within the scope of the present invention and can be determined easily by one of ordinary skill in the art. Generally from about 0.5% to about 1.0% by weight of additives are added to the low VOC solvent based adhesive.

The ingredients for the low VOC solvent based adhesive can be combined in any convenient manner. For example, all the ingredients can be mixed together uniformly by mixing means such as a mixer. Preferably, the two solvents are first mixed together. No special sequence or order is necessary. The thermoplastic resin and the thixotropic agent are then added to the solvent mixture; no special order is required. A stir mixer such as Grenier Mixer, Model 3002 with fast agitation is used to dissolve the solids in the solvent quickly. The mixer was set at 400–500 rpm for about 10–15 minutes. The mixture may then be placed on a slower moving roller mixer to evenly blend the composition. An example of a possible roll mixer which can be used is the Paul O. Abbe Ball Mill. The mixture was placed in this Ball Mill for one hour at 160 rpm.

The low VOC solvent based adhesive can be applied by any method of application to the two objects made from thermoplastic materials that are going to be joined. Although not necessarily, prior to the application of the application of the low VOC solvent based adhesive of this invention, the surfaces of the objects to be joined are lightly wiped with a brush or cloth containing acetone near the point of the desired joint. The low VOC solvent based adhesive can be applied by any method known in the art. Preferably, the low VOC solvent based adhesive is applied by a dauber to the two surfaces of the objects made from the thermoplastic materials, near the area of the desired joint. A uniform layer of adhesive is placed upon the two surfaces. Generally, a layer of approximately ½ to 1 mil thickness is placed upon the two surfaces. The joint can then be tested.

There are many uses of the low VOC solvent based adhesives of the instant invention. For example, the low VOC solvent based adhesive can be used to join thermoplastic pipe and fittings in various applications such as plumbing systems, cold and hot water distribution systems, sprinkler systems, spas, fire sprinkler systems, drain, waste and vent applications. The low VOC solvent based adhesive is useful for any other thermoplastic materials that can be joined. The following non-limiting examples serve to further illustrate the present invention in greater detail.

EXAMPLES

In the following examples, the novel low VOC solvent based adhesive of the instant invention was formulated. Generally, as a first step, a desired level for the VOC solvent based adhesive was determined. The desired VOC level is determined by the selection of the two solvents. Using SCAQMD 316A, the VOC constant for each of the solvents to be used in the low VOC solvent based adhesive was determined experimentally. The estimated VOC for the solvent based adhesive can then determine using the following equation: (VOC constant of solvent 1×% of solvent 1 based upon total amount of solvents in the adhesive) +(VOC constant of solvent 2×% of solvent 2 in adhesive based upon total amount of solvents) =estimated VOC level of the adhesive. Once this desired VOC constant was determined, the novel low VOC solvent based adhesive was formulated and the VOC level verified using SCAQMD 316A. The viscosity of the solvent cement was optimized via the addition of thixotropic agents. The green strength and the cure time were varied by adjustments of the solvent ratios while still maintaining a desired VOC level and viscosity.

The cure time may be varied to adjust for end-use needs. In the examples, the amount of the NMP and DMA was varied. The following examples were all tested for the VOC level, the cure time, the green strength and quick burst. The VOC level is measured using the test in SCAQMD 316A; the quick burst is measured using ASTM 1599 and the cure time is measured using Underwriters Laboratories UL 1821.

The green strength is tested by a procedure whereby the tester tries to pull or twist apart the bonded pipe and fitting. In carrying out the procedure, the inner part of the thermoplastic fitting and the outer part of the thermoplastic pipe (which fits in the fitting) are each coated with the same adhesive. At the end of one minute, the tester tries to pull or twist apart the two pieces. Generally, the bonded pipe and fitting are subjected to 6 foot-lbs. of torque during the test. If the two pieces do not come apart, this constitutes a "yes" which means that the experiment is repeated until a "no" is obtained. Each time the experiment is redone, one additional minute is added to the previous time. The time that a "no" is reached, indicates the green strength. The formulations as well as the results are set forth in Table 1.

Examples of commercial solvent cements with which the instant invention is compared and contrasted with include Orange Lo V.O.C. Medium Booked CPVC Cement (one step) and two steps cements available from Oatey; as well as the Weld-On CPVC 2714™ Orange Heavy Booked Cement (one step) and two step cements from IPS. Generally, the one step commercial solvent cements have a VOC level of about 450 grams/liter, whereas the two step cements have a VOC level greater than 650 grams/liter.

TABLE 1

| Ex. | DMA | NMP | Silica | TempRite 674 × 571 CPVC | VOC (g/l) | Green Strength (mm) | Viscosity (cp) | Quick Burst (psi) | DMA/ NMP Ratio |
|---|---|---|---|---|---|---|---|---|---|
| 1 | 20 | 65 | 2 | 13 | 154 | 2 | 1445 | >1400 | 0.31 |
| 2 | 30 | 55 | 2 | 13 | 143 | 1 | 2585 | >1400 | 0.55 |
| 3 | 40 | 45 | 2 | 13 | 164 | 1 | 9285 | >1400 | 0.89 |
| 4 | 45 | 40 | 2 | 13 | 128 | 1 | 69950 | >1400 | 1.125 |
| COMMERCIAL SOLVENT CEMENTS | | | | | >400 | 1–2 | 500–3000 | PIPE or >1400 FAILURE | |

Examples 1 through 4 in Table 1 illustrate that solvent based adhesive formulations having DMA/NMP ratio of from 0.31 to 1.125 have a lower VOC level than standard solvent cement formulations. Examples 3 and 4 would be unacceptable for commercial use due to the high viscosity although still effective as an adhesive.

TABLE 2

| EX. | DMA | NMP | Silica | TempRite 674 × 571 CPVC | Cyclo- hexa- none | MEK | THF | EA | MEOH | VOC (g/l) | DMA/ NMP Ratio | Green Strength (min.) | Viscosity (cp) | Quick Burst (psi) |
|---|---|---|---|---|---|---|---|---|---|---|---|---|---|---|
| 5 | 20 | 60 | 1 | 13 | | | | | 6 | 278 | 0.33 | 2 | 1940 | >1400 |
| 6 | 20 | 60 | 1 | 13 | 6 | | | | | 274 | 0.33 | 2 | 1672 | 785 PF |
| 7 | 26 | 55 | 1 | 13 | | | 5 | | | 267 | 0.47 | 3 | 1872 | 825 PF |
| 8 | 25 | 55 | 1 | 13 | 2 | 2 | 2 | | | 261 | 0.45 | 2 | 2136 | 850 PF |
| 9 | 26 | 55 | 1 | 13 | 5 | | | | | 268 | 0.47 | 1 | 1485 | >1400 |
| 10 | 26 | 55 | 1 | 13 | | 5 | | | | 239 | 0.47 | 2 | 1130 | >1400 |
| 11 | 30 | 50 | 2 | 13 | | | 5 | | | 250 | 0.60 | 2 | 2996 | 743 PF |
| 12 | 30 | 50 | 2 | 13 | | 5 | | | | 278 | 0.60 | 2 | 2992 | 938 PF |
| 13 | 30 | 50 | 2 | 13 | 5 | | | | | 283 | 0.60 | 1 | 2830 | >1400 |
| 14 | 30 | 50 | 2 | 13 | | | | 5 | | 250 | 0.60 | 2 | 2810 | >1400 |
| 15 | 45 | 35 | 2 | 13 | | | | 5 | | 293 | 1.29 | 3 | 54000 | 938 PF |
| 16 | 45 | 35 | 2 | 13 | | | 5 | | | 257 | 1.29 | 2 | 11140 | 900 PF |

TABLE 2-continued

| EX. | DMA | NMP | Silica | TempRite 674 × 571 CPVC | Cyclo-hexa-none | MEK | THF | EA | MEOH | VOC (g/l) | DMA/ NMP Ratio | Green Strength (min.) | Viscosity (cp) | Quick Burst (psi) |
|---|---|---|---|---|---|---|---|---|---|---|---|---|---|---|
| 17 | 45 | 35 | 2 | 13 | 5 | | | | | 232 | 1.29 | 3 | 10020 | 935 PF |
| 18 | 45 | 35 | 2 | 13 | | 5 | | | | 253 | 1.29 | 12 | 78700 | >1700 PF |
| 19 | 20 | 60 | 1 | 13 | | | | | 6 | 363 | 0.33 | 2 | 604 | >1400 |
| 20 | 20 | 60 | 1 | 13 | 6 | | | | | 321 | 0.33 | 2 | 580 | 1650 PF |
| 21 | 20 | 60 | 1 | 13 | | 6 | | | | 362 | 0.33 | 1 | 245 | 1625 PF |
| 22 | 20 | 60 | 1 | 13 | | | 6 | | | 341 | 0.33 | 1 | 300 | >1400 PF |
| 23 | 25 | 50 | 1 | 15 | | | 9 | | | 355 | 0.50 | 2 | 1112 | 1800 PF |
| 24 | 25 | 50 | 1 | 14 | 9 | | | | | 281 | 0.50 | 2 | 1468 | 675 PF |
| COMMERCIAL SOLVENT CEMENTS | | | | | | | | | | >400 | | 1–2 | 500–3000 | >1400 PSI OR PIPE FAILURE |

Examples 5 through 24 in Table 2 illustrate that solvent based adhesives having a DMA/NMP ratio of from 0.3 to 1.3 and having either a third minor solvent or combination of solvents which provide a minor portion (<10%) of the overall formulation will have a VOC level lower than 400 grams/liter and perform as well as existing commercial solvent based adhesive systems having a VOC level of 450 grams/liter or greater.

In these examples, the VOC levels are all below 300 g/l and the bond strength passes all enumerated criteria. Formulations 15, 16, 17, and 18 all would be commercially unacceptable due to the high viscosity, although still effective as an adhesive.

Examples 25 through 32 in Table 3 illustrate that low VOC solvent based adhesives having a DMA/NMP ratio of 0.3 and having a third minor solvent comprising <10% of the overall formulation will have a lower VOC level and the formulation will perform as well as existing commercial solvent based adhesives. Furthermore, if a lower molecular weight CPVC resin is used in the formulation, the viscosity can be improved and the adhesive can perform better than existing solvent based adhesives.

TABLE 3

| Ex. | DMA | NMP | Silica | TempRite 677 × 670 CPVC | TempRite 674 × 571 CPVC | Cyclo-hexan-one | MEK | THF | EA | VOC (g/l) | Green Strength | Quick Burst (psi) | Viscosity (cp) | DMA/NMP Ratio |
|---|---|---|---|---|---|---|---|---|---|---|---|---|---|---|
| 25 | 20 | 60 | 1 | 13 | | | | | 6 | 363 | 2 | >1400 | 604 | 0.33 |
| 26 | 20 | 60 | 1 | | 13 | | | | 6 | 308 | 2 | >1400 | 1904 | 0.33 |
| 27 | 20 | 60 | 1 | 13 | | 6 | | | | 321 | 2 | 1650 PF | 580 | 0.33 |
| 28 | 20 | 60 | 1 | | 13 | 6 | | | | 274 | 2 | 785 PF | 1672 | 0.33 |
| 29 | 20 | 60 | 1 | 13 | | | 6 | | | 362 | 1 | 1625 PF | 245 | 0.33 |
| 30 | 20 | 60 | 1 | | 13 | | 6 | | | 314 | 1 | >1400 PF | 885 | 0.33 |
| 31 | 20 | 60 | 1 | 13 | | | | 6 | | 341 | 1 | >1400 PF | 300 | 0.33 |
| 32 | 20 | 60 | 1 | | 13 | | | 6 | | 337 | 1 | >1400 PF | 975 | 0.33 |
| COMMERCIAL SOLVENT CEMENTS | | | | | | | | | | >400 | 1–2 | >1400 PSI OR PIPE FAILURE | 500–3000 | |

TABLE 4

| Ex. | TempRite 674 × 571 CPVC | Silica | NMP | MEK | DMA | VOC (g/l) | Viscosity (cp) | Quick Burst (psi) | DMA/NMP Ratio |
|---|---|---|---|---|---|---|---|---|---|
| 33 | 12 | 2 | 41 | 10 | 35 | 287 | 1460 | >1400 PF | 0.86 |
| 34 | 11.5 | 1.5 | 43 | 10 | 34 | 213 | 1200 | >1400 PF | 0.8 |
| 35 | 11.5 | 1.5 | 39 | 10 | 38 | 289 | 1325 | >1400 PF | 0.97 |
| 36 | 11.5 | 1.5 | 47 | 10 | 30 | 271 | 810 | >1400 PF | 0.64 |
| 37 | 13.5 | 1.5 | 43 | 10 | 32 | 274 | 1975 | >1400 PF | 0.74 |
| 38 | 13.5 | 1.5 | 50 | 8 | 27 | 201 | 1840 | >1400 PF | 0.54 |
| 39 | 13.5 | 1.5 | 48 | 8 | 29 | 243 | 1890 | >1400 PF | 0.6 |
| 40 | 10 | 2 | 44 | 10 | 34 | 252 | 610 | >1400 PF | 0.77 |
| 41 | 12.5 | 1.5 | 40 | 10 | 36 | 269 | 1950 | >1400 PF | 0.9 |

TABLE 4-continued

| Ex. | Temp-Rite 674 × 571 CPVC | Silica | NMP | MEK | DMA | VOC (g/l) | Viscosity (cp) | Quick Burst (psi) | DMA/NMP Ratio |
|---|---|---|---|---|---|---|---|---|---|
| 42 | 12.5 | 1.5 | 41 | 8 | 37 | 244 | 3305 | >1400 PF | 0.9 |
| 43 | 13.5 | 1.5 | 41 | 10 | 34 | 242 | 4210 | >1400 PF | 0.82 |

Examples 33 through 43 illustrate that solvent based adhesives having a DMA/NMP ratio from 0.54 to 0.97 and having MEK (2 Butanone) as a minor component at a level less than 10% of the overall formulation will have a lower VOC level than commercial solvent based adhesives (with a VOC level of 450 grams/liter or greater) and will perform as well as these commercial solvent based adhesives.

Furthermore, Example 38 illustrates that a solvent based adhesive having a DMA/NMP ratio less than 0.55 and having MEK (2 Butanone) as a minor component at a level less than 8% of the overall formulation will have a VOC level of 201 grams/liter and will perform as well as conventional solvent based adhesives.

In the next example, Example 44, the following components were used:
50% NMP
30% DBE-6 (DMA)
5% butanone (MEK)
13% TempRite 674×571 CPVC Resin
2% Silica
PROPERTIES

| Substrates Joined | VOC on Various Substrates (g/l) | Quick Burst on Various Substrates (psi) |
|---|---|---|
| CPVC | 250 | 938-pipe failure |
| PVC | 168 | 1575-pipe failure |
| ABS | 169 | 375-pipe failure |

The VOC level of the solvent based adhesive system was measured using SCAQMD 316A; the quick burst was measured using ASTM D-1599. The following properties were obtained:

Sustained Long Term Hydrostatic Pressure at Elevated Temperature (150° F., 370 psi pipe pressure, 1000 hours minimum time) —ASTM D-2837
 1"assembly 1158 hours with no failure
 3"assembly 1315 hours with no failure
Viscosity (Brookfield): 2792 cps (Brookfield Viscometer Spindle 5 at 100 rpm)

Green Strength: 2 min.
Lap Shear: 148 psi —UL 1821
Cure Times:

| at 73° F. | 7 min. |
| at 28° F. | 20 min. |
| at 0° F. (with acetone cleaning) | 45 min. |

Stress Crack Tendency
after 20 hours dulling of the plaque noted
after 202 hours swelling at the edges of the plaque noted.
Test discontinued.

The stress cracking tendency of the samples referred to above is measured in the following manner. Samples having a dimension of 7 cm ×3 mm×1.25 cm are prepared from compression molded plaques. These samples are inserted into a test fixture as described in Figure 1 of the article "Stress Cracking Of Rigid Polyvinyl Chloride By Plasticizer Migration", *Journal of Vinyl Technology*, December, 1984, Vol. 6, No. 4. The samples are inserted into the fixture by use of a benchtop vise. The sample is placed at the edge of the vise with approximately half of its width extending beyond the edges of the vise. The vise is then used to bend the sample until its ends are close enough to slide it into the edge of the test fixture. After the sample is positioned into the test fixture, the low VOC solvent based adhesive is applied to the sample using a medicine dropper. The sample is removed periodically from the chemical to check for signs of cracking, crazing or discoloration. Testing is carried out until failure is observed.

In the following examples, the first organic liquid solvent in the examples was NMP. The second organic liquid solvent was chosen from the group consisting essentially of pimelic acid, monomethyl glutarate, monomethyl pimelate, monomethyl azelate, monomethyl sebacate, monoethyl adipate, dimethyl succinate, dimethyl glutarate, dimethyl adipate, dimethyl pimelate, dimethyl suberate, dimethyl azelate, glutaryl chloride, adipoyl chloride, and pimeloyl chloride, or mixtures thereof. The VOC level, the green strength and the quick burst were measured for each combination, as set forth in Table 5.

TABLE 5

| Component | Amount | M-pyrol | Silica | TempRite 675 × 571 CPVC Resin | VOC (g/l) | Green Strength (min) | Quick Burst (psi) |
|---|---|---|---|---|---|---|---|
| Pimelic Acid | 19.5 | 72.9 | 1.4 | 6.2 | 283 | 1 | 1375 F |
| Monomethyl glutarate | 27 | 62 | 2 | 9 | 253 | 1 | 1200 F |
| Monomethyl | 25 | 65.6 | 1.9 | 7.5 | 158 | 1 | 1150 F |

TABLE 5-continued

| Component | Amount | M-pyrol | Silica | TempRite 675 × 571 CPVC Resin | VOC (g/l) | Green Strength (min) | Quick Burst (psi) |
|---|---|---|---|---|---|---|---|
| pimelate | | | | | | | |
| Monomethyl azelate | 40 | 45 | 3 | 12 | 121 | 3 | >1400 gel |
| Monomethyl sebacate | 40 | 45 | 3 | 12 | 137 | 3 | >1400 gel |
| Monoethyl adipate | 30.8 | 57.7 | 2.3 | 9.2 | 179 | 3 | 1000 F |
| Dimethyl succinate | 40 | 45 | 3 | 12 | 341 | | |
| Dimethyl glutarate | 40 | 45 | 3 | 12 | 289 | | |
| Dimethyl adipate | 40 | 45 | 3 | 12 | 152 | | |
| Dimethyl pimelate | 40 | 62 | 2 | 9 | 241 | 1 | 1450 F |
| Dimethyl suberate | 40 | 45 | 3 | 12 | 77 | 2 | >1400 |
| Dimethyl azelate | 40 | 45 | 3 | 12 | 114 | 2 | >1400 |
| Glutrayl Chloride | 27 | 62 | 2 | 9 | 197 | 1 | 1175 P |
| Adipoyl Chloride | 27.6 | 62.1 | 2.1 | 8.3 | 83 | 2 | 1400 F |
| Pimeloyl Chloride | 27 | 62 | 2 | 9 | 178 | 2 | 1100 F |

The data in this Table 5 shows that when the NMP is used in combination with one of the enumerated second organic liquid solvents, an adhesive composition is obtained with adequate properties.

In summary, a novel and unobvious low VOC solvent based adhesive has been as well as the process of applying such low VOC solvent based adhesive to two thermoplastic materials that are going to be joined together. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

We claim:

1. A low volatile organic content solvent based adhesive having a volatile organic content of less than 350 grams/liter as measured by the South Coast Air Quality Management District Regulation 316 A comprising two organic solvents, wherein said first organic solvent comprises N-methyl-2-pyrrolidone, and said second organic solvent selected from the group consisting of pimelic acid, monomethyl glutarate, monomethyl pimelate, monomethyl azelate, monomethyl sebacate, monomethyl adipate, dimethyl succinate, dimethyl glutarate, dimethyl adipate, dimethyl pimelate, dimethyl suberate, dimethyl azelate, glutaryl chloride, adipoyl chloride, pimeloyl chloride and mixtures thereof, and a thermoplastic resin.

2. A low volatile organic content solvent based adhesive as claimed in claim 1, wherein the N-methyl-2-pyrrolidone is found in the range of about 38 to about 65 weight percent of the low volatile organic content solvent based adhesive.

3. A low volatile organic solvent based adhesive as claimed in claim 1, wherein said second organic solvent is dimethyl adipate.

4. A low volatile organic content solvent based adhesive as claimed in claim 1, wherein said thermoplastic resin selected from the group consisting of polyvinyl chloride, chlorinated polyvinyl chloride, acrylonitrile butadiene styrene, and polystyrene.

5. A low volatile organic content solvent based adhesive as claimed in claim 4, wherein said thermoplastic resin is chlorinated polyvinyl chloride.

6. A low volatile organic content solvent based adhesive as claimed in claim 1, wherein the amount of the second organic solvent in the low volatile organic content solvent based adhesive is about from 20 to about 45 percent by weight of the adhesive.

7. A low volatile organic content solvent based adhesive as claimed in claim 4, wherein the amount of the thermoplastic resin is in the range of about 5 to about 20 percent by weight of the adhesive.

8. A low volatile organic content solvent based adhesive as claimed in claim 4, wherein the amount of the thermoplastic resin is in the range of about 10 to about 13.5 percent by weight of the adhesive.

9. A low volatile organic content solvent based adhesive having a volatile organic content level of less than 350 grams/liter as measured by South Coast Air Quality Management District Regulation 316A comprising about 10–13.5% of a thermoplastic resin, about 38–65% of N-methyl-2-pyrrolidone, about 20–45% of dimethyl adipate and about 1.5–2% of silica.

10. A low volatile organic content solvent based adhesive as claimed in claim 9, wherein said thermoplastic resin comprises chlorinated polyvinyl chloride.

11. A low volatile organic content solvent based adhesive comprising 13.5 wt. % of chlorinated polyvinyl chloride resin, 1.5 wt. % silica, 50 wt. % N-methyl-2-pyrrolidone, 8 wt. % methyl ethyl ketone and 27 wt. % dimethyl adipate.

12. A low volatile organic content solvent based adhesive as claimed in claim 11, having a volatile organic content level of less than 250 grams/liter as measured by South Coast Air Quality Management District Regulation 316A.

* * * * *

UNITED STATES PATENT AND TRADEMARK OFFICE
CERTIFICATE OF CORRECTION

PATENT NO. : 5,817,708
DATED : October 6, 1998
INVENTOR(S) : Carmen D. Congelio and Andrew M. Olah It is certified that error appears in the above-identified patent and that said Letters Patent is hereby corrected as shown below:

In column 13, line 63, after "organic", insert the word --content--.

Signed and Sealed this

Twenty-eighth Day of September, 1999

Attest:

Q. TODD DICKINSON

*Attesting Officer*                *Acting Commissioner of Patents and Trademarks*